United States Patent [19]
Sato et al.

[11] Patent Number: 5,985,480
[45] Date of Patent: Nov. 16, 1999

[54] ASSEMBLED BATTERIES

[75] Inventors: Kenji Sato; Nobuyasu Morishita; Hiroshi Inoue; Munehisa Ikoma, all of Toyohashi, Japan

[73] Assignee: Matsushita Electric Industrial Co., Ltd., Osaka, Japan

[21] Appl. No.: 08/915,466

[22] Filed: Aug. 20, 1997

[30] Foreign Application Priority Data

Aug. 21, 1996 [JP] Japan ................................. 8-219586

[51] Int. Cl.⁶ ................................................. H01M 2/20
[52] U.S. Cl. ............................. 429/65; 429/158; 429/160
[58] Field of Search .............................. 429/158, 65, 160, 429/159

[56] References Cited

U.S. PATENT DOCUMENTS

| | | | |
|---|---|---|---|
| 2,194,885 | 3/1940 | Critchfield et al. | 429/158 |
| 4,126,367 | 11/1978 | Miller | 339/29 B |
| 4,156,552 | 5/1979 | Wilson et al. | 339/29 B |
| 4,483,910 | 11/1984 | Julian | 429/179 |
| 4,579,790 | 4/1986 | Humphreys et al. | 429/65 |

FOREIGN PATENT DOCUMENTS

| | | |
|---|---|---|
| 3803 321 C1 | 7/1989 | Germany . |
| 380922 | 9/1932 | United Kingdom . |
| WO 89/04065 | 5/1989 | WIPO . |
| WO 95/10857 | 4/1995 | WIPO . |

OTHER PUBLICATIONS

Copy of European Search Report dated Jan. 23, 1998 for EP 97 30 6342.

*Primary Examiner*—John S. Maples
*Attorney, Agent, or Firm*—Ratner & Prestia

[57] ABSTRACT

In constructing assembled batteries by electrically connecting through a connecting bar the terminals of neighboring single cells by means of metallic parts of the terminals, by directly covering both sides of the connecting bar with the exception of the electrical connection with an insulating protecting layer of either natural rubber, synthetic rubber, or synthetic resin, and by directly or indirectly insulating and protecting the surface of the metallic parts for electrical connection, it was made possible to prevent corrosion of the connecting bar and the metallic parts for electrical connection, and to prevent capacity fluctuation due to heretofore observed leakage current of single cells composing electric vehicle batteries to be used under severe conditions for a long period and at a high operating voltage, thereby improving the reliability and dramatically reducing the maintenance load.

8 Claims, 3 Drawing Sheets

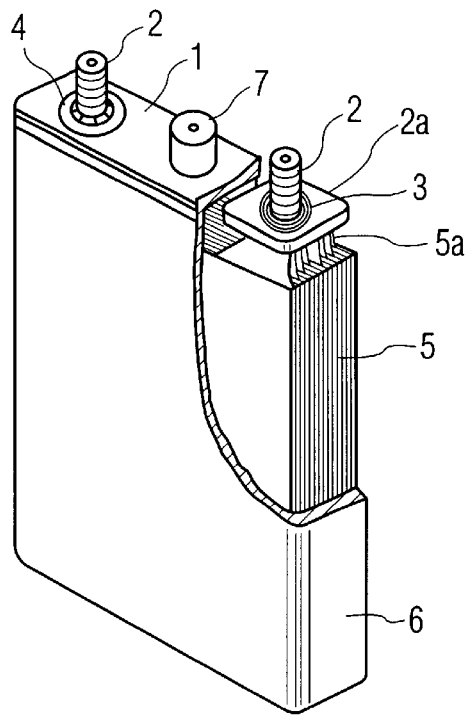
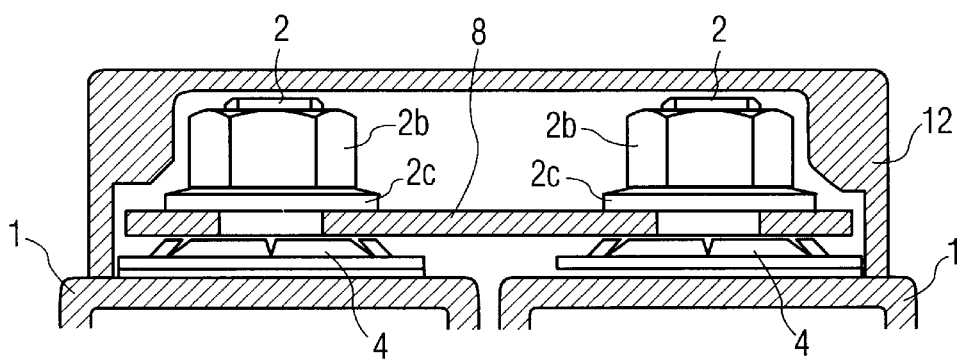
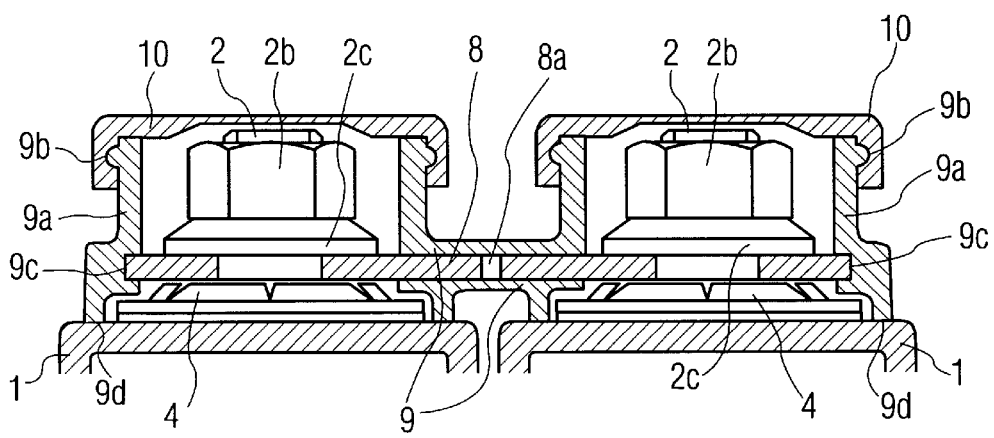
FIG. 1
FIG. 2
FIG. 3

ASSEMBLED BATTERIES

BACKGROUND OF THE INVENTION

1. Field of the Invention

This invention relates to assembled batteries and, more specifically, to layers and parts to insulate and protect metallic parts that electrically connect terminals of neighboring single cells in constructing assembled batteries.

2. Description of the Prior Art

While automotive application is one of the major applications of rechargeable batteries as represented by lead-acid batteries, various types of high energy density, small size and light weight rechargeable batteries have been developed in recent years, and are finding uses in many fields and the market is rapidly expanding. Typical examples of these applications include cordless equipment such as portable telephones, lap top computers, camcorders, and batteries for power supply such as uninterrupted power system (UPS) for computer backup and electric vehicles.

Thanks to advances in electronics technologies, cordless equipment consumes increasingly less power and the operating voltage and load current of the batteries for power supply have been suppressed. As a result, single cell or assembled batteries consisting utmost ten cells connected in series are often used as a battery pack.

On the other hand, with batteries intended for use as a power supply requiring operation at a high voltage and with heavy load as in stationary power supply for emergency and electric vehicles, a module battery with a desired nominal voltage is constructed by electrically connecting in series neighboring terminals of a plurality of single cells of the same nominal capacity by means of connecting bars, each single cell comprising positive electrodes and negative electrodes with a separator disposed between each of the positive and negative electrodes and housed in a battery container thereafter being injected with a volume of electrolyte. Depending on the requirement of nominal voltage, a plurality of such single cells are electrically connected in series and/or in parallel to make assembled batteries as a module battery.

In order to attain small size and light weight, module batteries usually use mono-block containers to allow integrated assembling of multiple single cells with the same capacity to obtain a nominal voltage of 6 volts or 12 volts by connecting them in series. However, in the case of a high nominal capacity battery exceeding 100 Ah, because of the constraint of available molding technology and economy of the battery container, module batteries and assembled batteries are usually made by assembling single cells housed in single-cell containers and connecting them in series and/or in parallel. For the connecting bar to electrically connect single cells, copper plate is generally used because of low ohmic resistance and relatively low cost. The connecting bar is fit to a pair of threaded bolt-like electrode poles that form the terminals of neighboring single cells, thereafter fastened by means of nuts together with washers to complete electrical connection. Surfaces of the metallic connecting parts including the connecting bar, electrode poles, washers, and nuts are generally plated with a corrosion resistant metal, such as lead (Pb) for lead-acid batteries, and mostly nickel (Ni) and in some cases silver (Ag) or gold (Au) for alkaline storage batteries such as of nickel-cadmium and nickel-metal hydride systems.

Among the batteries for power supply use, batteries for electric vehicles are required to have mechanical strength to withstand vibration, shock, acceleration, etc., which is equivalent to what is required of components of automobiles driven by internal combustion engines such as conventional gasoline engines and diesel engines. These batteries are also required to have not only high energy densities but also endurance to exhibit stable output characteristics over a wide temperature and humidity range under sustained exposure to dusts, splashes and corrosive substances over a long period. Even when the metallic parts that electrically connect individual single cells are plated with anticorrosive metal as described earlier, it is practically impossible to completely avoid pin holes in the plated metal layer, and sometimes corrosion appears on these metallic parts. Also, as these batteries are exposed to high temperature and high humidity over a long period, electrolyte leakage phenomenon may take place in which the electrolyte in a cell creeps up along a terminal and causes salting of the terminal and the vicinity. Since electric vehicles at times run on rough unpaved roads or winter roads sprinkled with antifreezing agents, there is a possibility that foreign objects get inside the installed housing of assembled batteries causing contamination and damage of the metallic parts and the battery surface. The foreign objects attached to and/or produced on the metallic parts and vicinity not only spoil the appearance but may also cause keeping of water resulting from moisture condensation due to temperature difference, or water splashes caused by car washing or rain, thereby wetting the metallic parts and the nearby top surface of the cover of each single cell ending in a liquid junction.

The total voltage of an electric vehicle battery ranges from about 100 volts to around 300 volts or in some case even to as high as 400 volts. When a high voltage is applied to a liquid junction formed as described above, a leakage current flows and causes reduction in the capacity as if some of the single cells in the assembled batteries have self-discharged. This further causes capacity fluctuation among individual single cells of the assembled batteries deteriorating the output characteristics of the electric vehicle battery. In an extreme case, it was observed that a single cell with reduced capacity had caused reversing polarity toward the end of discharge starting to evolve gas, and resulted in unrecoverable deterioration. Also, when the leakage current is large, there is a danger of fire due to heat generation or ignition. Therefore, it has been necessary to frequently clean and remove foreign objects from the surface of assembled batteries for electric vehicles, and the maintenance has been extremely troublesome.

FIG. 1 shows a partially cutaway perspective view of a single cell of nickel-metal hydride system that makes up a prismatic sealed alkaline storage battery for electric vehicles as an embodiment of this invention. In FIG. 1, an electrode group 5 is constructed with a plurality of positive plates and negative plates alternately stacked with a separator made of hydrophilic treated polypropylene nonwoven cloth disposed between each of the positive and negative plates. The positive plates are prepared by filling a high porosity nickel sheet with an active material paste mainly consisting of nickel hydroxide, followed by drying and pressing. The negative plates are prepared by coating both sides of a nickel plated and perforated steel sheet with a paste mainly consisting of hydrogen absorbing alloy powder of the MmNi$_5$ (Mm: Misch metal) group, followed by drying and pressing. Lead plates 5a of the positive and negative plates are respectively connected and fixed by welding to the bottom part of the base 2a of a pair of the electrode poles 2. After fitting an O-shaped ring 3 on each of the electrode poles 2 and fixing on the top surface of the base 2a, a pair of electrode poles 2 are inserted through the terminal holes (not shown in the drawing) of a synthetic resin cover 1 composing mainly of polypropylene, thereafter pushnuts 4 are press-fit to the top surface of the cover 1 thereby press-deforming the O-shaped rings 3 underneath the bottom surface of the cover 1 in a liquidtight and airtight manner. The electrode group 5 fixed to the cover 1 is inserted and housed in a cell container 6 made of the same material as the cover 1. The lower edge of the cover 1 and the upper open edge of the cell container 6 are thermally or ultrasonically fused together in a liquidtight and airtight manner. Preparation of a single cell is completed by pouring a predetermined amount of alkaline electrolyte mainly composing of potassium hydroxide, impregnating the electrode group 5 therewith, and providing a safety valve 7 in an airtight manner.

In constructing a module battery of 6 volts or 12 volts, 5 or 10 single cells prepared as above and having the same nominal capacity are electrically connected in series by connecting neighboring terminals of single cells by means of connecting bars.

FIG. 2 shows a partially sectional view of an example of conventional method of electrically connecting in series the terminals of neighboring single cells. In FIG. 2, a connecting bar 8 made of nickel-plated copper plate is press-fit to the electrode poles 2 of opposing polarity that have been fastened by pushnuts 4 and projecting upwardly of the top surface of each of the covers 1, and fastened by screwing with nuts 2b together with washers 2c thus completing electrical connection. Conventionally, metallic parts for electrical connection and the top surface of the covers 1 were covered with a protective cover 12 made of synthetic resin or synthetic rubber. Though this protective cover 12 was effective in preventing short-circuit between the terminals on the top surface of the battery, it was not sufficiently airtight and could not perfectly shut off the outside air from the battery allowing entry and attachment of foreign objects such as dusts and splashes. Therefore, leakage current due to a liquid junction at the terminals and vicinity continued to be caused requiring periodic cleaning, and maintenance problems remained unsolved.

SUMMARY OF THE INVENTION

This invention aims at constructing assembled batteries in which liquid junctions that have heretofore been observed on the metallic parts electrically connecting terminals of neighboring single cells and the vicinity can be prevented by covering the connecting bars electrically connecting terminals of neighboring single cells and other metallic parts for connecting terminals and their vicinity, with either an insulating protecting layer or insulating protecting components made either of synthetic rubber or synthetic resin. With this measure, it was made possible to make assembled batteries that require minimal maintenance yet provide a high reliability by preventing moisture condensation and corrosion by shutting off the metallic parts for electrical connection and their vicinity from the outside air thereby preventing reduction of capacity due to leakage current caused by liquid junctions produced at the electrical connection.

BRIEF DESCRIPTION OF THE DRAWING

FIG. 1 shows a partially cutaway perspective view of a prismatic sealed alkaline storage battery of nickel-metal hydride system for electric vehicles as an embodiment of the present invention.

FIG. 2 shows a fragmentary cross sectional view of a conventional electrical connection for connecting terminals of neighboring single cells.

FIG. 3 shows a fragmentary cross sectional view of the electrical connection for connecting terminals of neighboring single cells in the first embodiment of the present invention.

DETAILED DESCRIPTION OF THE INVENTION

Embodiments

Figure 4:
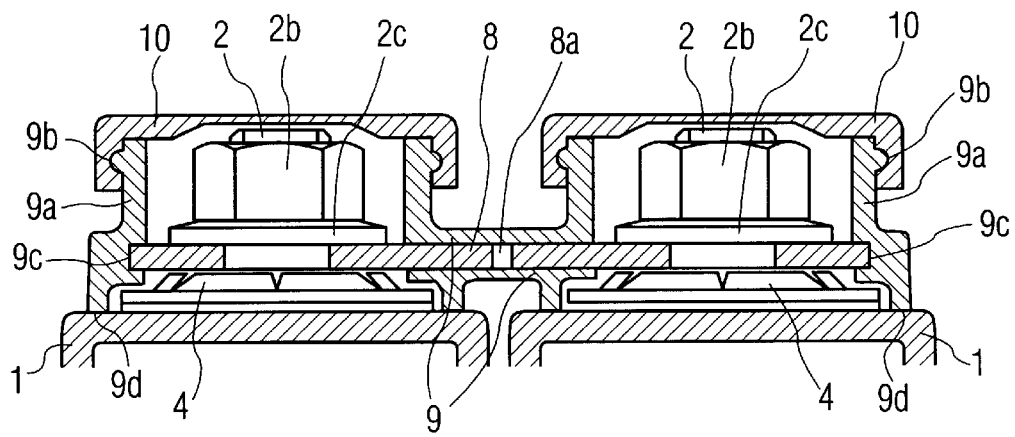
FIG. 4 shows a fragmentary cross sectional view of the same in the second embodiment of the present invention.

Referring to drawings, details of the present invention will be explained taking as an example a prismatic sealed alkaline storage battery of the nickel-metal hydride system for electric vehicles as shown in FIG. 1, which is an embodiment of the present invention.

First Embodiment

FIG. 3 shows a fragmentary cross sectional view of an electrical connection for connecting in series the terminals of neighboring single cells in the first embodiment of the present invention.

Referring now to FIG. 3, a connecting bar 8 made of nickel plated copper plate is press-fit to a pair of electrode poles 2 of opposing polarity from neighboring single cells and projecting upwardly of covers 1 and fastened with pushnuts 4. The connecting bar 8 has at least one through hole 8a both surfaces of which have been provided, with the exception of the electrical connection, with an insulating protector 9 made of chloroprene rubber layer. Using a molding die, the insulating protector 9 is molded in one-body together with the connecting bar 8 followed by vulcanization to a Shore hardness of 70. The through hole 8a of the connecting bar 8 is provided to allow easy flow of chloroprene rubber to both sides of the connecting bar 8 during molding in one-body and is effective in forming the insulating protector 9. In this embodiment, the insulating protector 9 has tubular projections 9a molded in one-body, on the upper open ends of which circular ridges 9b are provided and grooves 9c embrace both ends of the connecting bar 8. As the connecting bar 8 is fastened by means of the nuts 2b together with washers 2c, electrical connection is made while liquidtightness and airtightness are secured as the bottom surfaces 9d of the tubular projections 9a of the insulating protector 9 are pressed to the upper surfaces of the covers 1. Subsequently, protecting caps 10 are snapped over the upper open ends of the tubular projections 9a by means of the circular ridges 9b thereby shutting off the outside air from the connecting metallic parts and the vicinity. In this embodiment, the protecting caps 10 are made of chloroprene rubber similar to the insulating protector 9. It is easier to apply the caps over the tubular projections 9a if the hardness of the protecting caps 10 is lower, e.g., Shore hardness 50, than that of the insulating protector 9.

In the first embodiment, although chloroprene rubber was used for the insulating protector 9 and the protecting caps 10 to shut off the outside air from the electrically connecting metallic parts and the vicinity, it is possible to achieve the same purpose by choosing at least one type of material from rubber materials group including natural rubber, styrene rubber, butadiene rubber, butyl rubber, nitrile rubber, ethylene-propylene group copolymer, chlorinated rubber, acrylic rubber, silicone rubber, and fluororubber.

Second Embodiment

FIG. 4 shows a fragmentary cross sectional view of an electrical connection for connecting in series the terminals of neighboring single cells in the second embodiment of the present invention. FIGS. 3 and 4 are the same drawings having the same numbering and naming of components with the exception of the material of the insulating protector 9. In the second embodiment, the insulating protector 9 is made of synthetic resin mainly composing of polypropylene similar to the cover 1 of each single cell. In order to secure airtightness, the bottom surface 9d of the insulating protector 9 and the top surface of the cover 1 are fused together by either heating or ultrasonic method. For the protecting caps 10, polypropylene resin having a hardness lower than that of the insulating protection layer is used. For the protecting caps 10, not only polypropylene but also polyethylene resin and rubbers as suggested in the first embodiment can be used.

Third Embodiment

Figure 5:
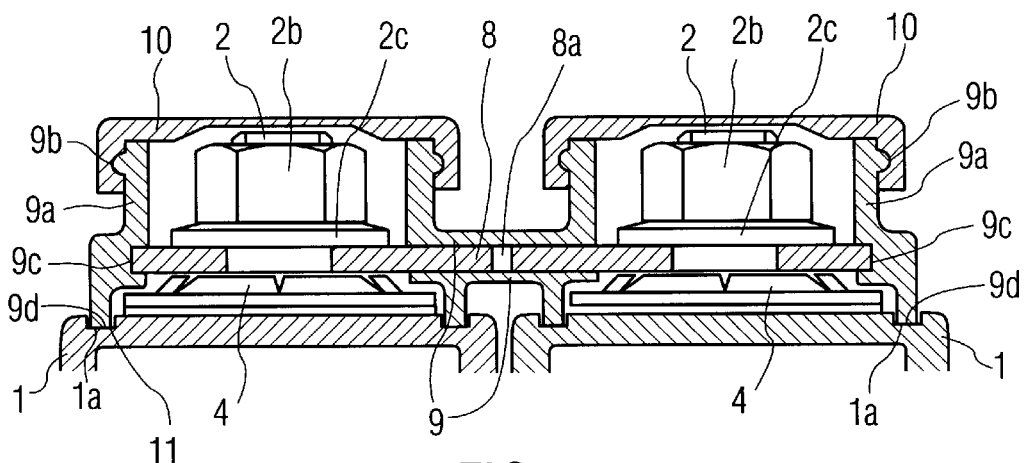
FIG. 5 shows a fragmentary cross sectional view of the same in the third embodiment of the present invention.

FIG. 5 shows a fragmentary cross sectional view of an electrical connection for connecting terminals of neighboring single cells in the third embodiment of the present invention. FIG. 5 is almost the same as FIGS. 3 and 4 having the same numbering and naming with the exception of the provision of groove 1a on the top surface of the cover 1 of a single cell to which the bottom end 9d of the insulating protector 9 is press-fit. In this third embodiment, the insulating protector 9 was made of polypropylene resin. In the third embodiment, as in the first and second embodiments, electrical connection is accomplished by fastening a connecting bar 8 which is press-fit to a pair of electrode poles 2 of opposing polarity from neighboring single cells by means of nuts 2b together with washers 2c while at the same time securing airtighness by the press-fitting of the bottom end 9d of the insulating protector 9 to the groove 1a provided on the top surface of cover 1 of each single cell. The protecting caps 10 are made of a material chosen from among those suggested in the second embodiment.

Fourth Embodiment

Figure 6:
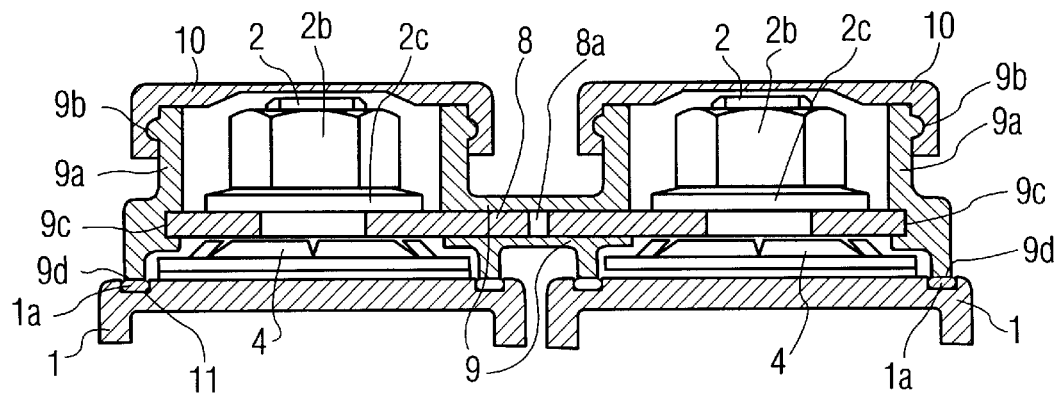
FIG. 6 shows a fragmentary cross sectional view of the same in the fourth embodiment of the present invention.

FIG. 6 shows a fragmentary cross sectional view of an electrical connection for connecting in series the terminals of neighboring single cells in the fourth embodiment of the present invention. FIG. 6 is almost the same as FIGS. 3 to 5 having the same numbering and naming with the exception of the provision of groove 1a on the top surface of the cover 1 of each single cell to keep an adhesive sealing compound 11. In this embodiment, the insulating protector 9 is formed of acrylonitrile-butadiene-styrene copolymer resin. Also, in this fourth embodiment, as in the third embodiment, electrical connection is accomplished by fastening by means of nuts 2b together with washers 2c a connecting bar 8 which is press-fit to a pair of electrode poles 2 of opposing polarity from neighboring single cells while at the same time securing airtightness by burying the bottom end 9d of the insulating protector 9 into the adhesive sealing compound 11 pre-applied in the groove 1a provided on the top surface of the cover 1 of each single cell, thereby bonding together the insulating protector 9 and the cover 1. As the material for the adhesive sealing compound, a mixture of blown asphalt, mineral oil, and solvent can be used after evaporating most of the solvent; an adhesive based on synthetic rubber, or an adhesive based on synthetic rubber and added with epoxy resin, can also be used. Although this fourth embodiment uses acrylonitrile-butadiene-styrene copolymer resin which is different from the material used for the cell container 6 and the cover 1 of single cells, other synthetic resins such as polyethylene, polypropylene, polyvinyl chloride, polystyrene, acrylonitrile-styrene copolymer, phenylene-ether-styrene copolymer, polyamide etc., can also be used.

The material for the protecting caps 10 can be selected from the materials suggested in the second embodiment.

Fifth Embodiment

Figure 7:
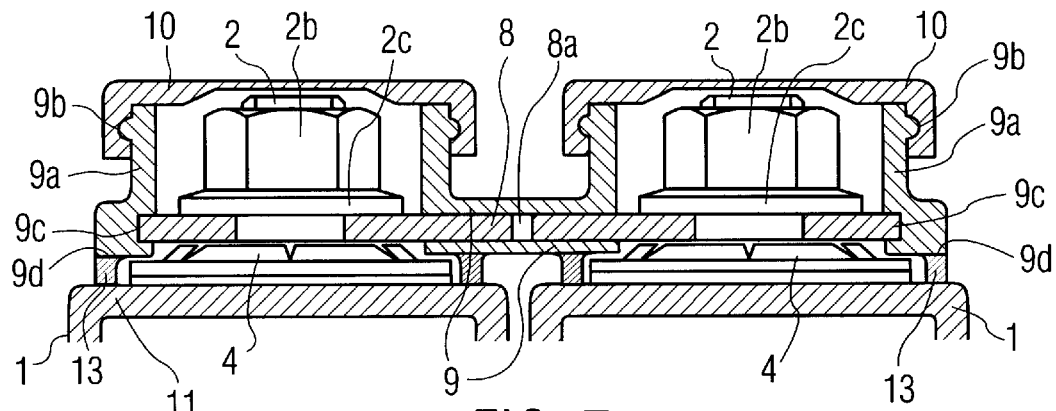
FIG. 7 shows a fragmentary cross sectional view of the same in the fifth embodiment of the present invention.

FIG. 7 shows a fragmentary cross sectional view of the electrical connection for connecting in series the terminals of neighboring single cells in the fifth embodiment. FIG. 7 is almost the same as FIGS. 3 to 6 having the same numbering and naming with the exception of the existence of rubber-made gasket 13 between the top surface of the cover 1 and the insulating protector 9 of each single cell. In this embodiment, the material for the insulating protector 9 can be chosen from among the various synthetic resins suggested in the fourth embodiment. For the gasket 13, a material chosen from among the various rubber materials suggested for the insulating protector 9 can be used. For the protecting cap 10, a material can be chosen from among those suggested in the second embodiment.

In this fifth embodiment, as in the first, third, and fourth embodiments, electrical connection is accomplished by fastening, together with washers 2c, a connecting bar 8 which is press-fit to a pair of electrode poles 2 of opposing polarity from neighboring single cells by means of nuts 2b, while at the same time securing airtightness and liquid tightness between the insulating protector 9 and the cover 1 of each single cell by press-deforming the rubber gasket 13 which has either been placed in advance on the top surface of the cover 1 of each single cell or provided in advance with an adhesive or by two-resin molding on the bottom surface 9d of the insulating protector 9. Assembling work becomes easy if the gasket 13 is bonded in advance on either the bottom surface 9d of the insulating protector 9 or on the top surfaces of the cover 1. Another effective method is to provide a groove 1a on the top surface of the cover 1 and fit an O-ring shaped gasket 13 into the groove as shown in FIG. 6.

Sixth Embodiment

Figure 8:
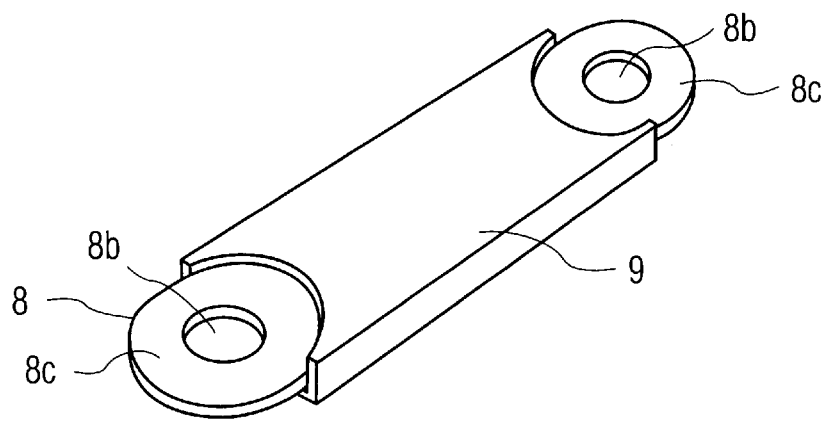
FIG. 8 shows a perspective view of a connecting bar provided with an insulating protecting layer in the sixth embodiment of the present invention.

FIG. 8 shows a perspective view of a connecting bar in the sixth embodiment of the present invention. In FIG. 8, the connecting bar 8 made of nickel plated copper plate is provided by one-body molding or like process with an insulating protecting layer 9 made of either natural rubber, synthetic rubber, or synthetic resin with the exception of the electrical connection part 8c in the vicinity of the terminal holes 8b on both ends which are to be press-fit to the electrode poles of neighboring single cells. By providing a through hole 8a in advance as shown in FIG. 9, the formation of the insulating protecting layer 9 can be effectively accomplished on both sides of the connecting bar 8.

Figure 9:
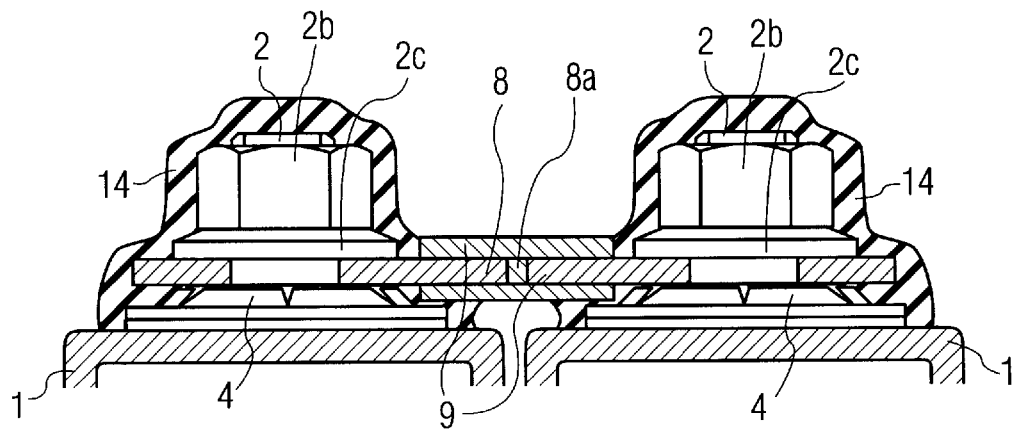
FIG. 9 shows a fragmentary cross sectional view of an electrical connection for connecting terminals of neighboring single cells in the sixth embodiment of the present invention.

FIG. 9 shows a fragmentary cross sectional view of the electrical connection for connecting in series the terminals of neighboring single cells in the sixth embodiment of the present invention.

In FIG. 9, the terminal holes 8b on both ends of the connecting bar 8 provided with an insulating protecting layer 9 with the exception of the portions on the ends for electrical connection are press-fit to a pair of electrode poles 2 of opposing polarity from neighboring single cells. The connecting bar 8 is then fastened with nuts 2b together with washers 2c to complete electrical connection. The metallic parts for electrical connection are subsequently coated with an insulating paint 14 mainly composing of synthetic rubber or synthetic resin so as to completely cover the exposed portions. Although in this sixth embodiment of the present invention the insulating protecting layer 9 provided on both sides of the connecting bar 8 was formed by molding in one piece, it can also be formed by coating insulating paint.

Subsequently, ten cells of prismatic sealed alkaline storage battery of the nickel-metal hydride system each having a nominal capacity of 100 Ah and a uniform practical capacity of ±1 Ah are prepared, followed by assembling into assembled batteries consisting of module batteries each having a nominal voltage of 12 volts by electrically connecting in series according to the first through sixth embodiments of the present invention and to the conventional method shown in FIG. 2.

After fully charging these module batteries, measuring their capacity, and fully charging them again, they were subjected to a neutral salt spray test in accordance with the Japan Industrial Standard JIS Z 2371. In the test, the module batteries were sprayed for 500 hours with a neutral salt aqueous solution having a concentration of 5±0.5 wt % (specific gravity at 35° C. being 1.0259–1.0329) prepared by dissolving sodium chloride (NaCl) in deionized water, and existence of corrosion in individual single cells making up the module batteries was visually inspected.

After the neutral salt spray test, the module batteries were left at 45° C. for a period of a month and the remaining capacity of each single cell of the module batteries was measured. The capacity of each single cell was measured at the same charge rate and discharge rate of 0.2 c (20 A). Table 1 summarizes the results obtained.

TABLE 1

| Module Battery | Generation of Corrosion | Remaining Capacity Ratio (%) |
| --- | --- | --- |
| First embodiment of Present Invention (See FIG. 3) | No | 76–78 |
| Second embodiment of Present Invention (See FIG. 4) | No | 77–79 |
| Third embodiment of Present Invention (See FIG. 5) | No | 76–78 |
| Fourth embodiment of Present Invention (See FIG. 6) | No | 76–78 |
| Fifth embodiment of Present Invention (See FIG. 7) | No | 75–77 |
| Sixth embodiment of Present Invention (See FIG. 9) | No | 75–77 |
| An Example of the Prior Art (See FIG. 2) | Yes | 51–65 |

In module batteries made in accordance with the prior art, corrosion of the metallic parts connecting terminals of neighboring single cells was caused by the neutral salt spray test, which resulted not only in a large fluctuation of the remaining capacity ratio after storage at a high temperature but also in relatively lower values as shown in Table 1. On the other hand, in the module batteries of the first through sixth embodiments, no corrosion was observed at all on the metallic parts for electrical connection even after the neutral salt spray test because the metallic parts electrically connecting single cells and the vicinity have been directly shut off by an insulating protecting layer or indirectly shut off by an insulating protector and components from the outside air. The remaining capacity ratio after the neutral salt spray test and storage at a high temperature was at least 75% and the fluctuation of capacity was also minimal. Based on the level of at least 75% of the remaining capacity ratio after being left at 45° C. for a month of the single cells of the sealed alkaline storage battery of nickel-metal hydride system used in this experiment, it can be judged that entirely no leakage of current has taken place in the assembled batteries according to the present invention.

As described above, it was confirmed that with this invention corrosion of metallic parts could be prevented and at the same time the capacity fluctuation due to leakage current of individual single cells making up assembled batteries could be prevented by shutting off from the outside air the entire surface of the metallic parts electrically connecting neighboring single cells by directly covering with an insulating protecting layer, or the metallic parts for electrical connection and the vicinity by directly or indirectly covering with an insulating protecting layer and protecting parts. Consequently, heretofore required maintenance work of periodically cleaning the metallic parts that electrically connect terminals of neighboring single cells and the vicinity has now become almost unnecessary.

In the preferred embodiments of the present invention, in electrically connecting electrode poles of neighboring single cells with a connecting bar, mechanical fastening by means of nuts and washers was employed as an example but other connecting methods such as welding or riveting can also be employed. As a matter of course, applicable electrical connection is not limited to series connection but includes parallel connection.

In some of the embodiments explained, a connecting bar having at least one through hole for providing on both sides thereof an insulating protecting layer made of either natural rubber, synthetic rubber, or synthetic resin by molding in one piece was shown. However, when the size of the connecting bar is large, it is more effective to make more than one through holes in a line.

In the above embodiments, although a detailed description has been made of a prismatic sealed alkaline storage battery of nickel-metal hydride system, this invention is not limited to battery systems.

A cell container made of synthetic resin was introduced as an example, but obviously this invention can be applied to module batteries and assembled batteries composing of single cells in metallic cell containers, prismatic and cylindrical cell containers as well as tubular cell container having an oval cross section.

As has been explained in detail, this invention not only makes it possible to prevent by simple means and construction corrosion of the metallic parts for electrical connection between the terminals of neighboring single cells, but to completely prevent capacity fluctuation of the individual single cells of assembled batteries due to leakage current resulting from liquid junction on the metallic parts and their vicinity.

The present invention not only prevents deterioration of the output characteristic of assembled batteries for electric vehicles to be used under severe conditions and at a high voltage over a long period but also provides high reliability assembled batteries with dramatically reduced maintenance load.

What is claimed is:

1. Assembled batteries comprising:
   a pair of battery cells having respective tops;
   a pair of covers covering said tops of the pair of battery cells;

a pair of terminals, having respective sides, projecting upwards from the respective covers;

a connecting bar, having a top surface and a bottom surface and respective ends, electrically connecting the pair of terminals;

an insulating layer, having an upper segment and a lower segment and a pair of side segments, the upper segment, positioned between the terminals, extending along a portion of the top surface of the connecting bar, and the lower segment, positioned between the covers, extending along a portion of the bottom surface of the connecting bar, and the pair of side segments, contacting said respective ends of the connecting bar, extending along the respective sides of the pair of terminals; and a gasket about each of the pair of terminals situated between the pair of covers and the pair of side segments of the insulating layer.

2. Assembled batteries according to claim 1, wherein the insulating layer is a protective layer which directly covers both the portion of the top surface of the connecting bar and the portion of the bottom surface of the connecting bar with the exception of a pair of electrical connections which electrically connect the pair of terminals via the connecting bar.

3. Assembled batteries according to claim 1, wherein a portion of the insulating layer, indirectly covering metallic parts which electrically connect the pair of terminals via said connecting bar, includes a tubular projection, the portion of the insulating layer is molded in one-body with the upper segment of the insulating layer, directly covering the portion of the top surface of the connecting bar, and with the lower segment of the insulating layer, directly covering the bottom surface of the connecting bar.

4. Assembled batteries according to claim 1, wherein, the insulating layer is a protective layer which directly covers both the portion of the top surface of the connecting bar and the portion of the bottom surface of the connecting bar, and a surface of metallic parts, electrically connecting the pair of terminals via the connecting bar, is directly covered with a painted insulating protecting layer.

5. Assembled batteries according to claim 3, wherein a bottom surface of the tubular projection and a top surface of one of the pair of covers are integrally and airtightly joined by one of pressing, welding, press-fitting, and bonding.

6. Assembled batteries according to claim 1, wherein the connecting bar and the insulating layer, directly covering the portion of the top surface of the connecting bar and the portion of the bottom surface of the connecting bar, are molded in one-body.

7. Assembled batteries according to claim 3, wherein the insulating layer, directly covering the portion of the top surface of the connecting bar and the portion of the bottom surface of the connecting bar, and the tubular projection are molded in one-body.

8. Assembled batteries according to claim 6, wherein the connecting bar has at least one through hole.

* * * * *